United States Patent [19]

Takahashi et al.

[11] Patent Number: 5,416,818
[45] Date of Patent: May 16, 1995

[54] X-RAY TV CAMERA HAVING FUNCTION TO SWITCH A VISUAL FIELD OF X-RAY IMAGE

[75] Inventors: Fumitaka Takahashi, Toride; Hisatake Yokouchi, Tokyo; Sadao Takahshi, Higashimurayama, all of Japan

[73] Assignee: Hitachi Medical Corporation, Tokyo, Japan

[21] Appl. No.: 145,575

[22] Filed: Nov. 4, 1993

[30] Foreign Application Priority Data

Nov. 10, 1992 [JP] Japan .................................. 4-299415

[51] Int. Cl.⁶ .............................................. A61B 6/00
[52] U.S. Cl. .................................. 378/98.7; 378/98.2
[58] Field of Search ................... 378/98.7, 98.2, 98.8, 378/98, 62, 114, 115, 116

[56] References Cited

U.S. PATENT DOCUMENTS

| | | | |
|---|---|---|---|
| 4,573,183 | 2/1986 | Relihan | 378/98.7 X |
| 4,930,144 | 5/1990 | Plut et al. | 378/98.7 |
| 4,955,043 | 9/1990 | Nekovar | 378/98.7 X |
| 5,164,583 | 11/1992 | Aichinger et al. | 378/98.7 X |

Primary Examiner—David P. Porta
Attorney, Agent, or Firm—Antonelli, Terry, Stout & Kraus

[57] ABSTRACT

An X-ray TV camera apparatus having a function to switch a visual field of an X-ray image, comprising an X-ray generating apparatus, an image intensifier for converting X-ray information by an X-ray which was generated from the X-ray generating apparatus and passed through an object to be examined into an optical image, a TV camera for converting the optical image from the image intensifier into the video signal, a switch to switch the visual field of the X-ray image on the image intensifier, and a correcting circuit to shading correct the video signal so that the video signal from the TV camera gives a uniform image in accordance with the visual field switched by the switch.

6 Claims, 2 Drawing Sheets

FIG. 1
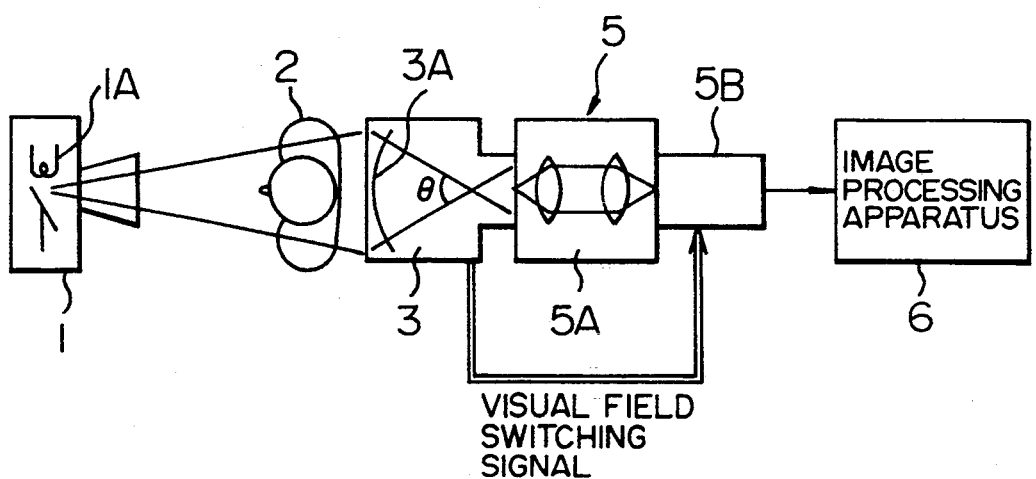
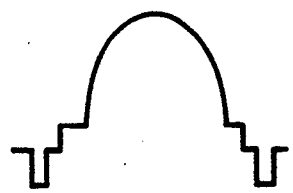
FIG. 3A
MODULATION SHADING
OF VIDEO SIGNAL
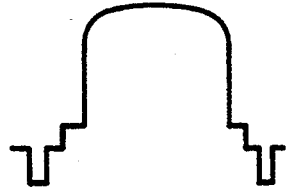
FIG. 3B
WAVEFORM AFTER
SHADING CORRECTION

X-RAY TV CAMERA HAVING FUNCTION TO SWITCH A VISUAL FIELD OF X-RAY IMAGE

BACKGROUND OF THE INVENTION

The invention relates to an X-ray camera apparatus having a function to switch a visual field of an X-ray image and, more particularly, to an X-ray camera apparatus which can obtain a good X-ray image even when the visual field of the X-ray image in an image intensifier is switched.

The X-ray TV camera apparatus is applied to an image diagnosing apparatus to obtain a fluoroscopic image of an object to be examined and is an apparatus in which an X-ray image that is obtained by passing through the object to be examined is converted into a visible light by an image intensifier (X-ray fluorescent multiplier) and the visible light is converted into an electric signal by a TV camera.

The electric signal which is obtained by the TV camera is converted into a the digital signal and is subjected to proper image processes and, after that, the processed signal is supplied to a display apparatus such as a CRT or the like.

In the X-ray TV camera apparatus with such a construction, an amount of X-ray which is irradiated to the input surface of the image intensifier is not uniform. That is, a difference in uniformity occurs between the central portion and the peripheral portion since the input surface of the intensifier is curved, a lens of the TV camera is curved, and the like. Because of those causes, there occurs a phenomenon such that the electric signal from the TV camera decreases as the position of an optical image is deviated from the center (optical axis) of the optical image to the periphery. Therefore, correcting means for correcting such a phenomenon, namely, so called shading correcting means is provided. The shading correcting means is disclosed in "Image Electronic Circuit", issued by Corona Co., Ltd., pages 89 to 93 and 110, Oct. 15, 1980.

As disclosed in "Shimazu's Criticism", pages 113 to 119, issued on September, 1963, for example, as such an image intensifier, there has been known an image intensifier having a function in which a visual field of an optical image obtained by the image intensifier can be varied in accordance with the necessity.

In the X-ray TV camera apparatus with the above construction, however, the correction setting in the shading correcting means is unconditionally, namely, fixedly determined on the basis of the above causes. Therefore, even when the visual field of the image intensifier is switched, its correction amount is never changed.

In recent years, the size of screen of the image intensifier has been increasing more and more. A luminance difference between the central portion and the peripheral portion of the X-ray image, which doesn't a large problem even when the visual field of the X-ray image is changed in the conventional small image intensifier, increases in association with the increase in screen. Consequently, a uniform X-ray image cannot be obtained due to the size of visual field.

That is, in the case where the visual field of the image intensifier is switched, the image pickup area of the input surface of the image intensifier changes in accordance with the switching. The curved state of the input surface of the image intensifier of each image pickup area substantially changes (when it is optically observed) each time the visual field is switched. Thus, it has been found out that an attenuation amount of the electric signal from the TV camera changes.

Therefore, there is a problem such that the conventional shading correcting means cannot sufficiently correct because its correction amount is fixed.

SUMMARY OF THE INVENTION

It is, therefore, an object of the invention to provide an X-ray TV camera apparatus in which in spite of the fact that a visual field of an image intensifier is switched, sufficient shading correction can be performed in accordance with such a switching.

To accomplish the above object, an X-ray TV camera apparatus according to the present invention is fundamentally constructed by an X-ray generating apparatus, an image intensifier for converging X-ray by an X-ray which was generated from the X-ray generating apparatus and passed through the object to be examined into an optical image, and a TV camera for converting the optical image from the image intensifier into the electric signal and in which the image intensifier has a function such that a visual field of an X-ray image can be switched, wherein the X-ray TV camera apparatus has correcting means for correcting unevenness of the luminance of the X-ray image in the TV camera which is caused in accordance with the switching of the visual field due to the visual field switching function.

The X-ray TV camera apparatus with the above construction has the function which can switch the visual field of the X-ray image in the image intensifier and also has correcting means for correcting unevenness of the luminance of the X-ray image in the TV camera in accordance with the switching of the visual field, namely, shading correcting means with a novel construction.

Therefore, due to the switching of the visual field of the image intensifier, the proper shading correction according to the switched visual field can be executed, and the image which is displayed on the display apparatus such as a CRT or the like can be uniformly displayed over the whole region without fluctuation.

BRIEF DESCRIPTION OF THE DRAWINGS

FIG. 1 is a block diagram showing an outline of an X-ray TV camera apparatus having a function to switch a visual field of an X-ray image regarding the present invention;

FIGS. 3A and 3B are waveform diagrams for explaining the operation of the X-ray TV camera apparatus according to the invention.

DESCRIPTION OF THE PREFERRED EMBODIMENT

Figure 2:
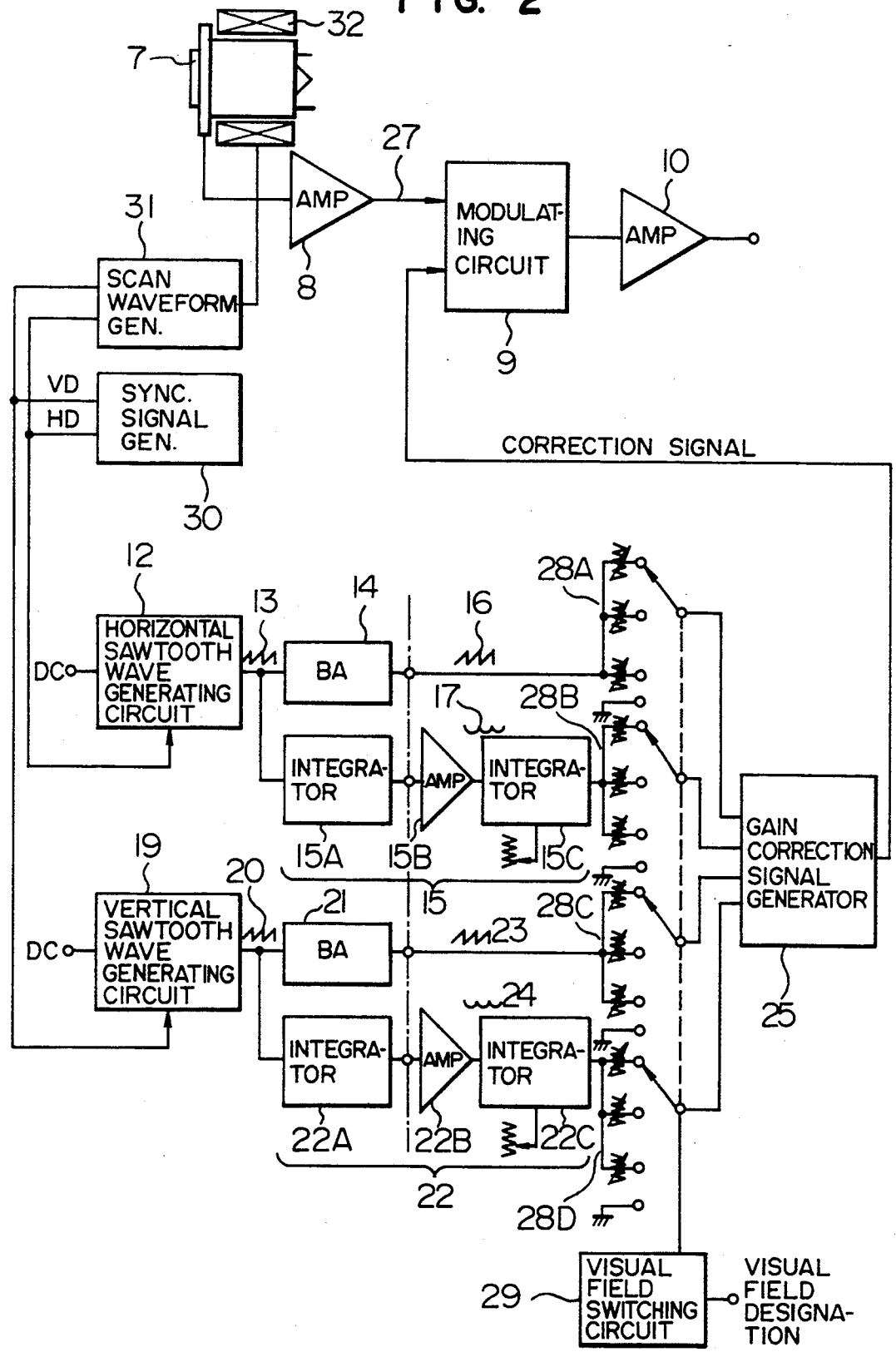
FIG. 2 is a block circuit diagram showing an embodiment of the X-ray TV camera apparatus according to the invention.

FIG. 1 is a schematic block diagram showing an embodiment of an X-ray TV camera apparatus according to the invention.

In the diagram, there is an X-ray generating apparatus 1. An X-ray is irradiated to the object to be examined 2 from an X-ray tube 1A provided for the X-ray generating apparatus 1.

The X-ray transmitted through the object to be examined 2 is inputted into an image intensifier (hereinafter, abbreviated to "I.I.") 3. A radioscopic visible image (fluoroscopic image) of the object to be examined 2 is derived by the I.I. 3.

Even when an amount of X-ray which is inputted to the I.I. 3 is uniform, a variation occurs in the luminances between the center and the peripheral portion the screen. Because of such a fluctuation, an uneven electric signal corresponding to such a fluctuation occurs in an output of a TV camera 5, which will be explained hereinlater.

Since an input surface 3A of the I.I. 3 is formed as a curved surface, the output electric signal of the TV camera 5 at a position that is deviated from the center to the peripheral portion causes an attenuation according to such a deviation amount.

The I.I. 3 shown in the embodiment has a visual field switching function which can variably change the visual field in accordance with the necessity when the optical image obtained by the I.I. 3 is formed on the TV camera 5 side. That is, an angle $\theta$ shown in FIG. 1 can be changed.

The visible image obtained by the I.I. 3 is inputted to a TV camera main body 5B through an optical system 5A of the TV camera 5. The visible image information is converted into the electric signal (video signal).

In the TV camera 5, further, the electric signal is corrected by a shading correcting circuit, which will be explained in detail in FIG. 2.

The video signal is supplied to an image processing apparatus 6 and is image processed. After that, the processed image signal is supplied to an image display apparatus (not shown) comprising, for instance, a CRT, so that the fluoroscopic visible image (X-ray is displayed.

FIG. 2 is a circuit diagram showing an embodiment of the TV camera 5 and shows a circuit diagram including the shading correcting circuit.

In FIG. 2, an output signal from an image pickup tube 7 including the optical system 5A is supplied to a modulating circuit 9 through a preamplifier 8. An output signal from the image pickup tube 7 which is supplied to the modulating circuit 9 is a video signal which is not yet corrected. In the modulating circuit 9, the video signal is multiplied with a correction signal by a shading correcting circuit, which will be explained hereinlater, so that it is corrected and the corrected signal is outputted from the modulating circuit 9.

The corrected video signal is outputted through a processing amplifier 10.

A sync signal generator 30 generates a horizontal sync signal HD and a vertical sync signal VD. A scanning waveform generator 31 generates a horizontal and vertical scanning waveform signals to be applied to deflection coils 32 of the pickup tube 7.

The shading correcting circuit to form the correction signal that is supplied to the modulating circuit 9 will now be described with reference to Fig. 2.

In FIG. 2, a horizontal sawtooth wave generating circuit 12 comprises: a mirror integrating circuit includes an operational amplifier and an integration capacitor and is generally well known; and an electronic switch connected to both ends of the integrating circuit. A DC voltage DC and the horizontal sync signal HD from the sync signal generator 30 are supplied to the horizontal sawtooth wave generating circuit 12, from which a horizontal sawtooth wave signal 13 is generated.

A vertical sawtooth wave generating circuit 19 also has a construction similar to the horizontal sawtooth wave generating circuit 12 and receives the DC voltage DC and the vertical sync signal VD from the sync signal generator 31 and generates a vertical sawtooth wave signal 20.

The horizontal sawtooth wave signal 13 is amplified to a signal 16 of a proper level by a buffer amplifier 14 and is sent to a group of switches 28A and is also supplied to a parabola wave generating circuit 15.

The parabola wave generating circuit 15 comprises an integrator 15A, an amplifier 15B, and an integrator 15C. The integrator 15A can be omitted. The horizontal sawtooth wave is transmitted through the integrator 15A and the amplifier 15B and is supplied to the integrator 15C, by which a parabola wave 17 is produced and supplied to a group of switches 28B. It will be easily understood that the parabola wave 17 can be obtained by integrating a sawtooth wave such that the voltage is equal to 0.

The vertical sawtooth wave signal 20 is amplified to a signal 23 of a proper level by a buffer amplifier 21. After that, the amplified signal is supplied to a group of switches 28C and to a parabola wave generating circuit 22, by which a parabola wave signal 24 is formed and supplied to a group of switches 28D. The parabola wave generating circuit 22 comprises an integrator 22A, an amplifier 22B and an integrator 22C in a manner similar to the circuit 15.

Each of the switch groups 28A, 28B, 28C, and 28D has switching positions of four stages which can be selected. At each switching position, a variable resistor circuit in which mutually different predetermined voltage drops are performed is provided. When a visual field is designated from the outside by the operator, each of the switch groups 28A to 28D is switched to the switching position corresponding to the designated visual field by a visual field switching circuit 29.

That is, since each of the switch groups 28A to 28D is switched to the switching position at the first stage, a predetermined voltage drop occurs in each of the horizontal sawtooth wave 16, parabola wave 17, vertical sawtooth wave 23, and parabola wave 24 and those voltage dropped signals are supplied to a gain correction signal generator 25. When each of the switch groups 28A to 28D is switched to the switching position the second stage, a predetermined voltage drop occurs in each of the horizontal sawtooth wave 16, parabola wave 17, vertical sawtooth wave 23, and parabola wave 24 and those voltage dropped signals are supplied to the gain correction signal generator 25. In the case where those switch groups are switched to the switching positions at the third stage, respectively, operations similar to those mentioned above are also executed.

In the case where each of the switch groups 28A to 28D is switched to the switching position at the fourth stage, each of the horizontal sawtooth wave 16, parabola wave 17, vertical sawtooth wave 23, and parabola wave 24 is not inputted. Those waves are switched in the case where no shading correction is needed.

The gain correction signal generator 25 mixes the sawtooth waves and parabola waves from four switch groups 28A to 28D and produces a correction signal. Since the sawtooth wave and parabola wave have the waveforms produced on the basis of the horizontal sync signal HD or vertical sync signal VD from the sync signal generator 30 for scanning an electron beam in the image pickup tube 7, the gain correction signal generator 25 generates a shading correction value for the position corresponding to the pixel position on each picture plane at each momentary time point of the video signal synchronously with the video signal. Namely, the gain correction signal generator 25 generates a correction signal which increases as the position is from the central portion of the screen to the peripheral portion. In this case, a signal such that the correction signal symmetrically increases from the central portion toward the peripheral portion is not always required but an asymmetrical correction signal is generally required. Therefore, by adjusting the levels of the sawtooth waves 16 and 23 by the buffer amplifiers 14 and 21, a desired correction signal can be obtained. A change ratio of the level of the correction signal from the center of the correction signal toward the peripheral portion can be adjusted by the amplifiers 15B and 22B or the like.

The correction signal generated from the gain correction signal generator 25 is supplied to the modulating circuit 9, by which it is multiplied with a video signal as shown in FIG. 3A that is supplied from the image pickup tube 7 through the amplifier 8 and is corrected to a video signal as shown in FIG. 3B which was shading corrected. The corrected video signal is outputted as a normal video signal through the amplifier 10.

The modulating circuit 9 is constructed by a negative feedback amplifier. By changing a negative feedback impedance of the negative feedback circuit by the correction signal, a negative feedback amount is adjusted and the video signal is modulated, thereby performing the shading correction.

In the shading correcting circuit shown in FIG. 2 described above, when the visual field of the image on the image intensifier is switched, the switch groups 28A to 28D are switched by the visual field switching circuit 29 and desired sawtooth wave and parabola wave are selected and supplied to the gain correction signal generator, from which the correction signal adapted to the designated visual field is outputted. The video signal is properly shading corrected by the modulating circuit 9.

According to the X-ray TV camera apparatus with the construction of the embodiment as mentioned above, the apparatus has the visual field converting function which can switch the visual field of the X-ray image in the I.I. 3 and also has the correcting means for correcting the attenuation of the electric signal in the image peripheral section in the image intensifier and TV camera 5 in accordance with the visual field conversion, namely, the shading correcting means with the novel construction.

Therefore, by the visual field switching operation of the I.I. 3, the proper shading correction can be performed in accordance with the visual field. The image can be displayed on the display apparatus such as a CRT or the like with a uniform contrast without a fluctuation in the whole region.

In the embodiment, the I.I. 3 having the construction such that the visual field is switched at three stages has been shown. The invention, however, is limited to such an example but can be also applied to another construction in which the visual field is switched at an arbitrary number of stages. Consequently, the correction amount of the shading correcting circuit can be varied at the same number of stages as the number of visual field switching stages.

What is claimed is:

1. An X-ray TV camera apparatus having a function to switch a visual field of an X-ray image, comprising:
   an X-ray generating apparatus;
   an image intensifier for converting X-ray information by an X-ray which was generated from said X-ray generating apparatus and passed through an object to be examined into an optical image;
   a TV camera for converting an optical image from said image intensifier into the video signal;
   means for switching and designating a visual field of an X-ray image of the image intensifier at a plurality of stages;
   means for generating a correction signal to correct a difference of a sensitivity of said image intensifier due to a difference of the position in the optical image which is converted by said image intensifier in accordance with the visual field of the X-ray image designated by said switching means; and
   means of correcting the video signal from the TV camera by the correction signal form said correction signal generating means.

2. An apparatus according to claim 1, wherein said video correcting means is means for multiplying the video signal from the TV camera and the correction signal from the correction signal generating means.

3. An apparatus according to claim 1, wherein said correction signal generating means generates a correction signal which changes in accordance with the visual field of the X-ray image designated by said switching means.

4. An apparatus according to claim 1, wherein said switching means switches and designates a visual field at a plurality of stages corresponding to a plurality of visual fields, and said correction signal generating means generates a correction signal which changes in accordance with the visual field of the plurality of visual fields of the X-ray image designated by said switching means.

5. An X-ray TV camera apparatus having a function to switch a visual field of an X-ray image, comprising:
   an X-ray generating apparatus;
   an image intensifier for converting X-ray information by an X-ray which was generated from said X-ray generating apparatus and passed through an object to be examined into an optical image;
   a TV camera for converting an optical image from said image intensifier into the video signal;
   means for switching and designating a visual field of an X-ray image of the image intensifier at a plurality of stages;
   means for generating a correction signal to correct a difference of a gain of said video signal due to a difference of the position in the X-ray image which is photographed by the TV camera in accordance with the visual field of the X-ray image designated by said switching means; and
   means for correcting the video signal from the TV camera by the correction signal from said correction signal generating means;
   wherein said correction signal generating means has switch means which is switched interlockingly with the switching operation by said switching means so as to generate the correction signal corresponding to the visual field designated by the switching means.

6. An X-ray TV camera apparatus having a function to switch a visual field of an X-ray image, comprising:
   an X-ray generating apparatus;
   an image intensifier for converting X-ray information by an X-ray which was generated from said X-ray generating apparatus and passed through an object to be examined into an optical image;

a TV camera for converting an optical image from said image intensifier into the video signal;

means for switching and designating a visual field of an X-ray image of the image intensifier at a plurality of stages;

means for generating a correction signal to correct a difference of a gain of said video signal due to a difference of the position in the X-ray image which is photographed by the TV camera in accordance with the visual field of the X-ray image designated by said switching means; and means for correcting the video signal from the TV camera by the correction signal from said correction signal generating means;

wherein said correction signal generating means comprises:

a circuit to produce a horizontal direction correction signal and a vertical direction correction signal on the basis of a horizontal sync signal and a vertical sync signal which are obtained from a sync signal generator for said TV camera;

a plurality of output means for adjusting each of said horizontal and vertical direction correction signals so as to be adapted to a plurality of visual fields and outputting the adjusted signals;

switch means which is switched interlockingly with the switching operation by said switching means so as to select the horizontal and vertical direction correction signals corresponding to the visual field designated by said switching means in said plurality of output means; and correction signal synthesizing means for synthesizing the horizontal and vertical direction correction signals selected by said switch means and for producing said correction signal.

* * * * *